United States Patent
Takikawa

(10) Patent No.: US 8,255,115 B2
(45) Date of Patent: Aug. 28, 2012

(54) METHOD FOR CONTROLLING EXTERNAL CONTROL TYPE FAN COUPLING DEVICE

(75) Inventor: Kazunori Takikawa, Numazu (JP)

(73) Assignee: Usui Kokusai Sangyo Kaisha, Ltd., Sunto-gun (JP)

( * ) Notice: Subject to any disclaimer, the term of this patent is extended or adjusted under 35 U.S.C. 154(b) by 794 days.

(21) Appl. No.: 12/311,999

(22) PCT Filed: Oct. 18, 2007

(86) PCT No.: PCT/JP2007/070334
§ 371 (c)(1),
(2), (4) Date: Apr. 22, 2009

(87) PCT Pub. No.: WO2008/050667
PCT Pub. Date: May 2, 2008

(65) Prior Publication Data
US 2009/0277740 A1    Nov. 12, 2009

(30) Foreign Application Priority Data
Oct. 26, 2006    (JP) .................................. 2006-291378

(51) Int. Cl.
*F16D 35/02* (2006.01)
*F16D 31/00* (2006.01)
*F01P 7/08* (2006.01)
*F01P 7/02* (2006.01)
*F16D 31/06* (2006.01)

(52) U.S. Cl. ................... 701/36; 701/67; 701/68

(58) Field of Classification Search ............... 123/41.49, 123/41.56–41.7, 339.16–339.17, 392; 701/36, 701/67–68
See application file for complete search history.

(56) References Cited

U.S. PATENT DOCUMENTS

| 5,099,654 | A | * | 3/1992 | Baruschke et al. | 62/180 |
| 5,575,368 | A | * | 11/1996 | Kikuchi et al. | 192/58.3 |
| 7,128,690 | B2 | * | 10/2006 | Inoue et al. | 477/175 |
| 7,407,046 | B2 | | 8/2008 | Bhat et al. | |
| 2003/0172883 | A1 | | 9/2003 | Shiozaki et al. | |
| 2003/0192763 | A1 | | 10/2003 | Inoue et al. | |
| 2004/0223851 | A1 | | 11/2004 | Shiozaki et al. | |
| 2006/0096554 | A1 | | 5/2006 | Shiozaki | |
| 2006/0096830 | A1 | | 5/2006 | Shiozaki et al. | |
| 2006/0272918 | A1 | | 12/2006 | Shiozaki et al. | |

FOREIGN PATENT DOCUMENTS

GB    2368101    4/2002

(Continued)

OTHER PUBLICATIONS

International Search Report dated Jan. 29, 2008, issued on PCT/JP2007/070334.

(Continued)

*Primary Examiner* — Khoi Tran
*Assistant Examiner* — Dale Moyer
(74) *Attorney, Agent, or Firm* — Edwards Wildman Palmer LLP

(57) ABSTRACT

In a method for controlling an external control type fan coupling device 3, arithmetic processing to determine the rotation speed of fan 4 with a quick acceleration detection signal used as a parameter is carried out at a high frequency than that in arithmetic processing to determine the rotation speed of fan 4 using signals other than the quick acceleration detection signal as a parameter.

20 Claims, 4 Drawing Sheets

FOREIGN PATENT DOCUMENTS

| | | |
|---|---|---|
| JP | 62-004639 | 1/1987 |
| JP | 64-53634 | 4/1989 |
| JP | 2001-317279 | 11/2001 |
| JP | 2002-195303 | 7/2002 |
| JP | 2003-156072 | 5/2003 |
| JP | 2003-239741 | 8/2003 |
| JP | 2004-340373 | 12/2004 |
| JP | 2006-004144 A | 1/2006 |
| JP | 2006-112466 | 4/2006 |
| JP | 2006-162062 | 6/2006 |
| JP | 2006-162063 | 6/2006 |
| JP | 2007-092753 | 4/2007 |

OTHER PUBLICATIONS

Notification of Reason(s) for Refusal mailed Jan. 10, 2012, issued for the Japanese patent application No. 2006-291378 and English translation thereof.

* cited by examiner

METHOD FOR CONTROLLING EXTERNAL CONTROL TYPE FAN COUPLING DEVICE

TECHNICAL FIELD

The present invention relates to a method for controlling an external control type fan coupling device, in detail, to a method for controlling an external control type fan coupling device, which controls an external control type fan coupling device disposed between a fan drive output shaft side of an internal combustion engine and a fan based on various types of signals such as an accelerator opening signal, in order to control the rotation speed of an internal combustion engine cooling fan in a vehicle such as an automobile, etc.

BACKGROUND ART

Conventionally, an external control type fan coupling device has been disclosed, which consists of a combination of an electromagnet and a fluid coupling, a combination of an electromagnetic clutch and a magnet type coupling, or a combination of an electric actuator and a fluid coupling, and a method for controlling a rotation speed of a fan has been disclosed, which uses a control system such as PID control (feedback control system based on proportion, integration and differential) and adaptive control based on sensor output signals such as an accelerator opening degree signal, an internal combustion engine coolant temperature signal, an internal combustion engine rotation speed signal, etc., in regard to the external control type fan coupling device. (For example, refer to Patent Documents 1 through 7).

Patent Document 1: Japanese Published Patent Application No. 2003-239741 A
Patent Document 2: Japanese Published Patent Application No. 2004-340373 A
Patent Document 3: Japanese Published Patent Application No. 2002-195303 A
Patent Document 4: Japanese Published Patent Application No. 2003-156072 A
Patent Document 5: Japanese Published Patent Application No. 2006-162062 A
Patent Document 6: Japanese Published Patent Application No. 2006-162063 A
Patent Document 7: Japanese Published Patent Application No. 2006-112466 A

DISCLOSURE OF THE INVENTION

Objects to be Solved by the Invention

However, any one of the Patent Documents described above do not disclose that the frequency of arithmetic processing for speed control of fan rotation is set to a different value, depending on the type of sensor output signal. In the Patent Documents described above, the arithmetic process is carried out simultaneously at the same frequency with respect to all the sensor output signals.

Therefore, where the frequency of arithmetic processing is set to a low value such as 0.5 Hz or so, there may occur a case where a rapid change (increase) in an accelerator opening degree (throttle opening degree) in quick start or quick acceleration of a vehicle is not reflected in the result of arithmetic processing. Where a rapid increase in the accelerator opening degree is not reflected in the result of arithmetic processing, the rotation speed at the driven side of a fan coupling device is rapidly increased following a rapid increase in the rotation speed at the drive side of the fan coupling device in line with a rapid increase in the accelerator opening degree, wherein the rotation speed of the fan will rapidly increase. Accordingly, this results in a lowering in the acceleration capacity due to horsepower being taken by the driven side of the fan coupling device and generation of large noise in the fan. And, where a high rotation speed state of the fan is sustained in response to a high opening degree of the accelerator after quick start or quick acceleration, not only is large noise sustained from such a fan, but also a great loss in horsepower is brought about, wherein fuel efficiency is lowered.

On the other hand, where the frequency of arithmetic processing is set to a high frequency such as 10 Hz or so, it is necessary that ECU (Electronic Control Unit) executes arithmetic processing of all the output signals from various types of sensors at a high frequency (short cycle), wherein a CPU capable of performing the arithmetic processing at a high rate and a large capacity of memory will be required. In addition, with the calculation load in the ECU increased, there is a fear that arithmetic processing for other control by the ECU is delayed or heat generation from the CPU is increased.

The present invention was developed in view of the above-described points, and it is therefore an object of the present invention to provide a method for controlling an external control type fan coupling device capable of reducing fan noise and a loss in horsepower, improving acceleration performance of a vehicle and reducing a calculation load in ECU by making different the execution frequency of arithmetic processing to control the rotation speed of the fan in cases of a quick acceleration detection signal such as an accelerator open degree, etc., and other signals than the quick acceleration detection signal.

Means for Solving the Object

A method for controlling an external control type fan coupling device according to the present invention generates a control signal by arithmetically processing a quick acceleration detection signal and a signal other than the quick acceleration detection signal in an arithmetic processing portion in order to control the rotation speed of a fan provided at the driven side of the external control type fan coupling device, and controls torque transmission from the drive side to the driven side of the external control type fan coupling device by the control signal, which is featured in that the arithmetic processing portion carries out arithmetic processing of the quick acceleration detection signal at a higher frequency than in arithmetic processing of signals other than the quick acceleration detection signal.

According to the present invention, it is possible to detect quick start and quick acceleration of a vehicle in order to carry out arithmetic processing of a quick acceleration detection signal in a short cycle and instantaneously reflect the same in the arithmetical processing result, wherein it becomes possible to suppress a rapid increase in the rotation speed of the fan by controlling to suppress the rotation speed at the driven side with respect to a rapid increase in the rotation speed at the drive side of an external control type fan coupling device in line with quick start and quick acceleration. Therefore, it is possible to reduce fan noise, to reduce a loss in horse power, and to achieve favorable acceleration of a vehicle when a vehicle is started or accelerated. Also, according to the present invention, since signals other than the quick acceleration detection signal are arithmetically processed in a long cycle, a CPU that carries out arithmetic processing at a high rate and a memory of large capacity are not required. Arithmetic processing for other control by an ECU can be smoothly carried out with the calculation load in the ECU reduced, and it becomes possible to suppress heat generation from the CPU.

Here, it is preferable that the arithmetic processing of the quick acceleration detection signal is carried out at a frequency of approximately 1 through 5 Hz. If the frequency is less than approximately 1 Hz, response to quick start and quick acceleration of a vehicle is lowered, where a desired effect cannot be obtained. Also, if the frequency is higher than approximately 5 Hz, almost no difference is brought about in effect, wherein the calculation load in the ECU and the memory capacity are increased, heat generation from the ECU is increased, the interval of generation of valve seating noise of valve members is shortened, and noise from the external control type fan coupling device is increased.

Further, it is preferable that arithmetic processing of signals other than the quick acceleration detection signal is carried out at a frequency from approximately 0.05 through 0.2 Hz. If the frequency is less than approximately 0.05 Hz, the radiator coolant (engine coolant) and air conditioner refrigerant pressure, etc., cannot be accurately obtained, and the same cannot be reflected in control thereof, wherein some problems such as overheating, overcooling, and a lowering in the temperature response of air conditioner occur. Also, if the frequency is higher than approximately 0.2 Hz, almost no difference is brought about in effect, wherein an effect of reducing the calculation load in the ECU and the memory capacity is reduced, and an effect for lowering the heat generation from the ECU is reduced.

Also, signals other than the quick acceleration detection signal include an engine rotation speed signal and a fan rotation speed signal, and the arithmetic processing of the engine rotation speed signal and the fan rotation speed signal may be carried out at a higher frequency than the arithmetic processing of the signals other than those in the arithmetic processing of the signals other than the quick acceleration detection signal. If so, fine control in response to the engine status and the fan status is enabled, and the control performance is further improved, wherein the fan noise can be remarkably suppressed, and the fuel efficiency can be remarkably improved.

In addition, the quick acceleration detection signal is a signal that is used to detect quick acceleration (including quick start), wherein an accelerator opening degree signal (that is, a throttle opening degree signal) may be used as the quick acceleration detection signal in a vehicle in which acceleration is carried out by using an accelerator pedal.

Further, in the method for controlling an external control type fan coupling device, the external control type fan coupling device is provided with a torque transmission gap portion provided between the drive side and the driven side thereof, into and out of which oil flows, a valve member for opening and closing an oil circulation passage, which is provided in the oil circulation passage communicating with the corresponding torque transmission gap portion, and an electromagnet for controlling valve opening and closing operations of the corresponding valve member, wherein the effective contact area of oil with the drive side and the driven side in the torque transmission gap portion is increased or decreased by controlling current supply to the electromagnet by means of the control signal, and torque transmission from the drive side to the driven side can be controlled.

Or, the external control type fan coupling device is provided with an electromagnetic clutch provided at the drive side and a magnet coupling provided at the driven side, wherein the electromagnetic clutch and the magnet coupling are connected to and disconnected from each other by controlling current supply to the electromagnetic clutch by means of the control signal, and torque transmission from the drive side to the driven side can be controlled.

Or, the external control type fan coupling device is provided with a torque transmission gap portion provided between the drive side and the driven side, into and out of which oil flows, a valve member provided in an oil circulation passage communicating with the corresponding torque transmission gap portion, which controls opening and closing of the corresponding oil circulation passage, and an electric actuator for controlling valve opening and closing operations of the corresponding valve member, wherein the effective contact area of oil with the drive side and the driven side in the torque transmission gap portion is increased or decreased by controlling current supply to the electric actuator by means of the control signal, and torque transmission from the drive side to the driven side can be controlled.

Effects of the Invention

According to the present invention, since arithmetic processing of a quick acceleration detection signal can be carried out in a short cycle, it becomes possible to instantaneously control the torque transmission from the drive side to the driven side of the external control type fan coupling device so as to be minimized when detecting quick start or quick acceleration of a vehicle. Therefore, it is possible to attempt to reduce fan noise in quick start or quick acceleration of a vehicle, to reduce the loss in horsepower, and to carry out favorable acceleration of the vehicle. In addition, according to the present invention, since arithmetic processing of signals other than the quick acceleration detection signal is carried out in a long cycle, the calculation load in the ECU can be reduced, and the memory can be downsized, wherein it becomes possible to prevent heat from being generated from the CPU.

DESCRIPTION OF REFERENCE NUMERALS

Figure 1:
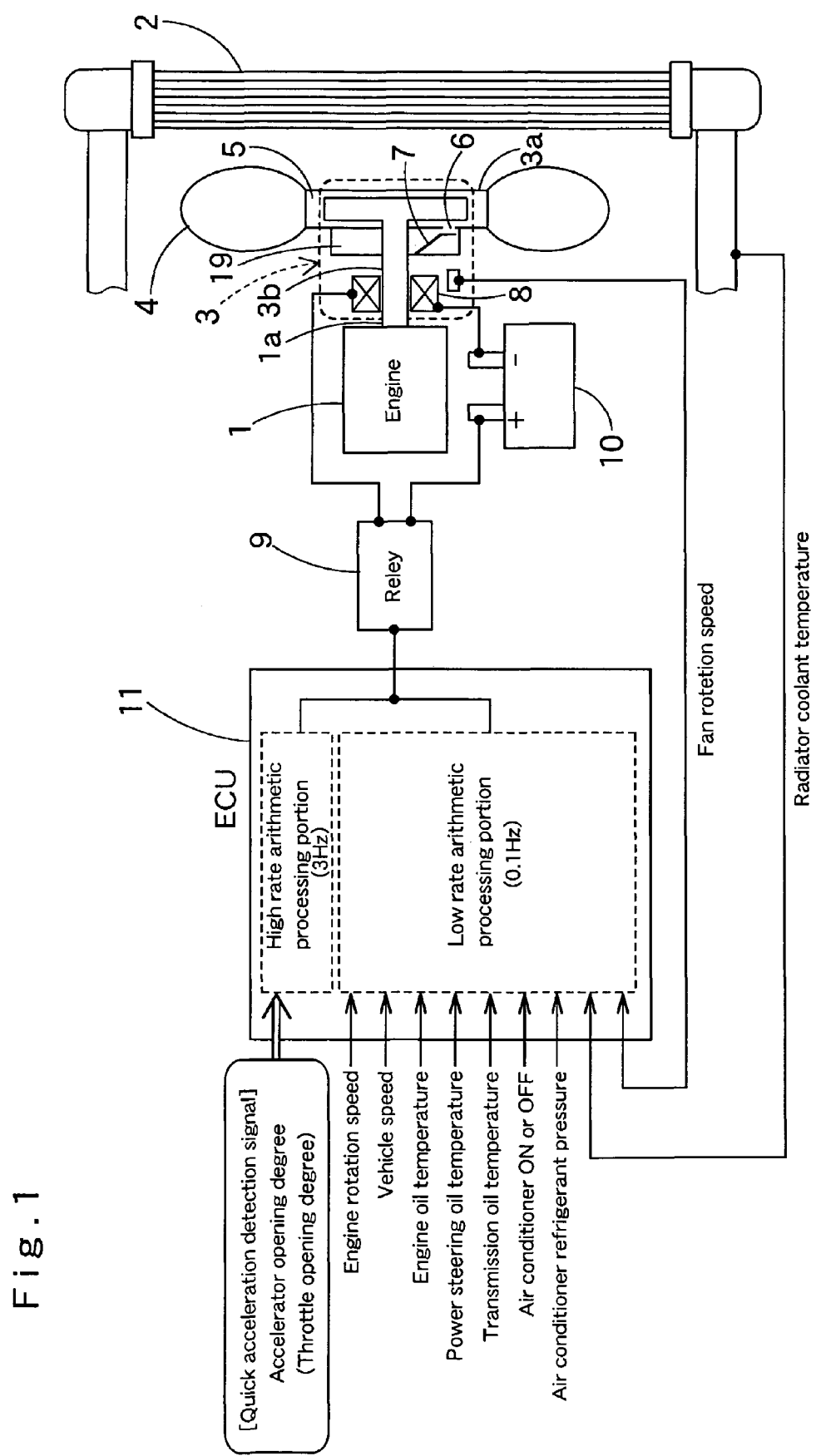
FIG. 1 is a configuration diagram of a system for carrying out a method for controlling an external control type fan coupling device according to one embodiment of the present invention.

1 Internal combustion engine (Engine)
3 External control type fan coupling device
3a Driven side
3b Drive side
4 Fan
5 Torque transmission gap portion
6 Oil circulation passage
7 Valve member
8 Electromagnet
11 ECU (Electronic Control Unit/Arithmetic Processing Portion)
12 Electromagnetic clutch
13 Magnet coupling
14 Electric actuator

BEST MODE FOR CARRYING OUT THE INVENTION

Hereinafter, a description will be given of embodiments of the present invention based on the drawings. Since respective embodiments described below relate to a method for controlling an external control type fan coupling device of a vehicle that carries out acceleration using an accelerator pedal, an accelerator opening degree signal is used as a quick acceleration detection signal.

Figure 2:
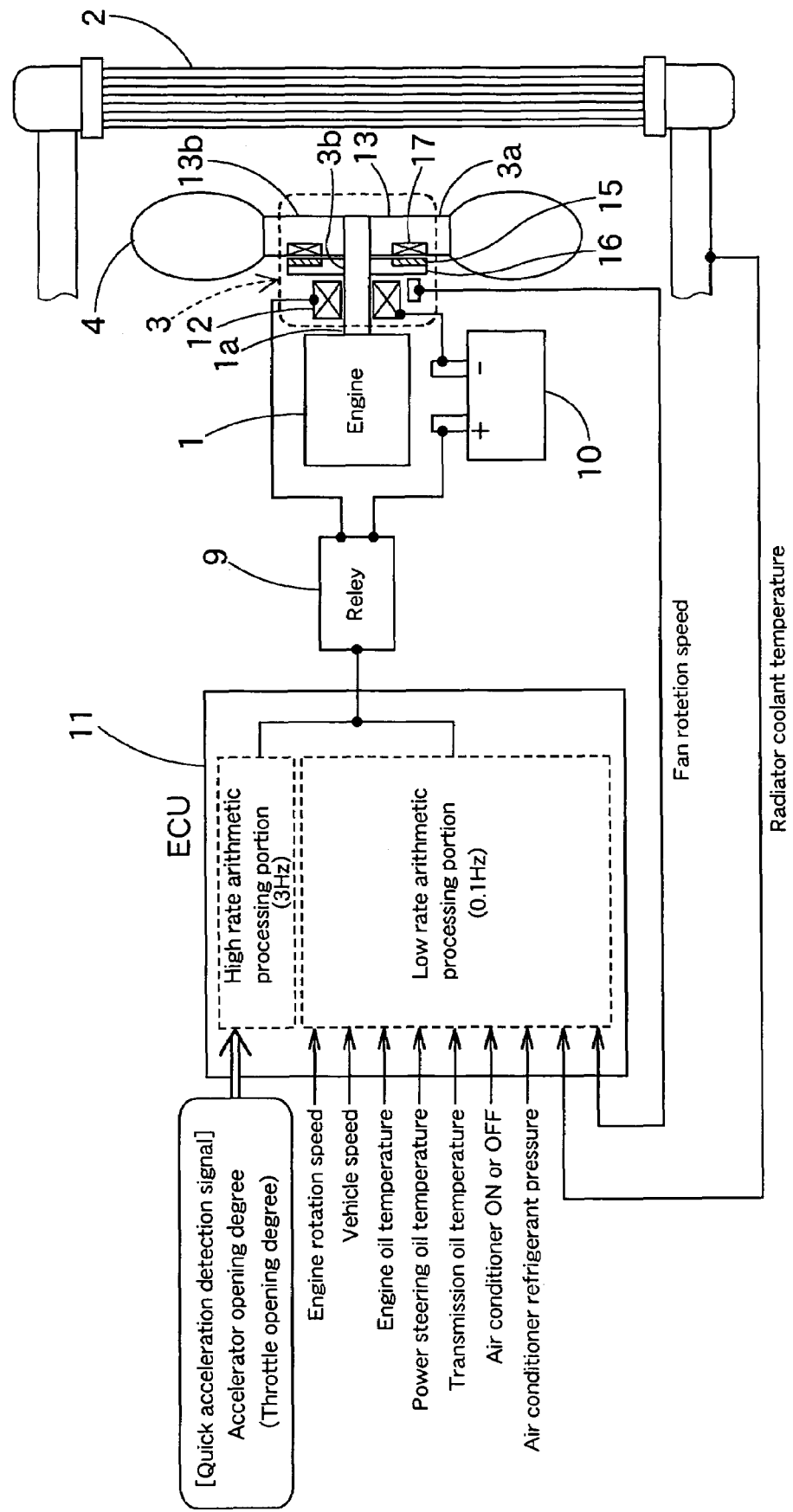
FIG. 2 is a configuration diagram of another system for carrying out the same controlling method.
Figure 3:
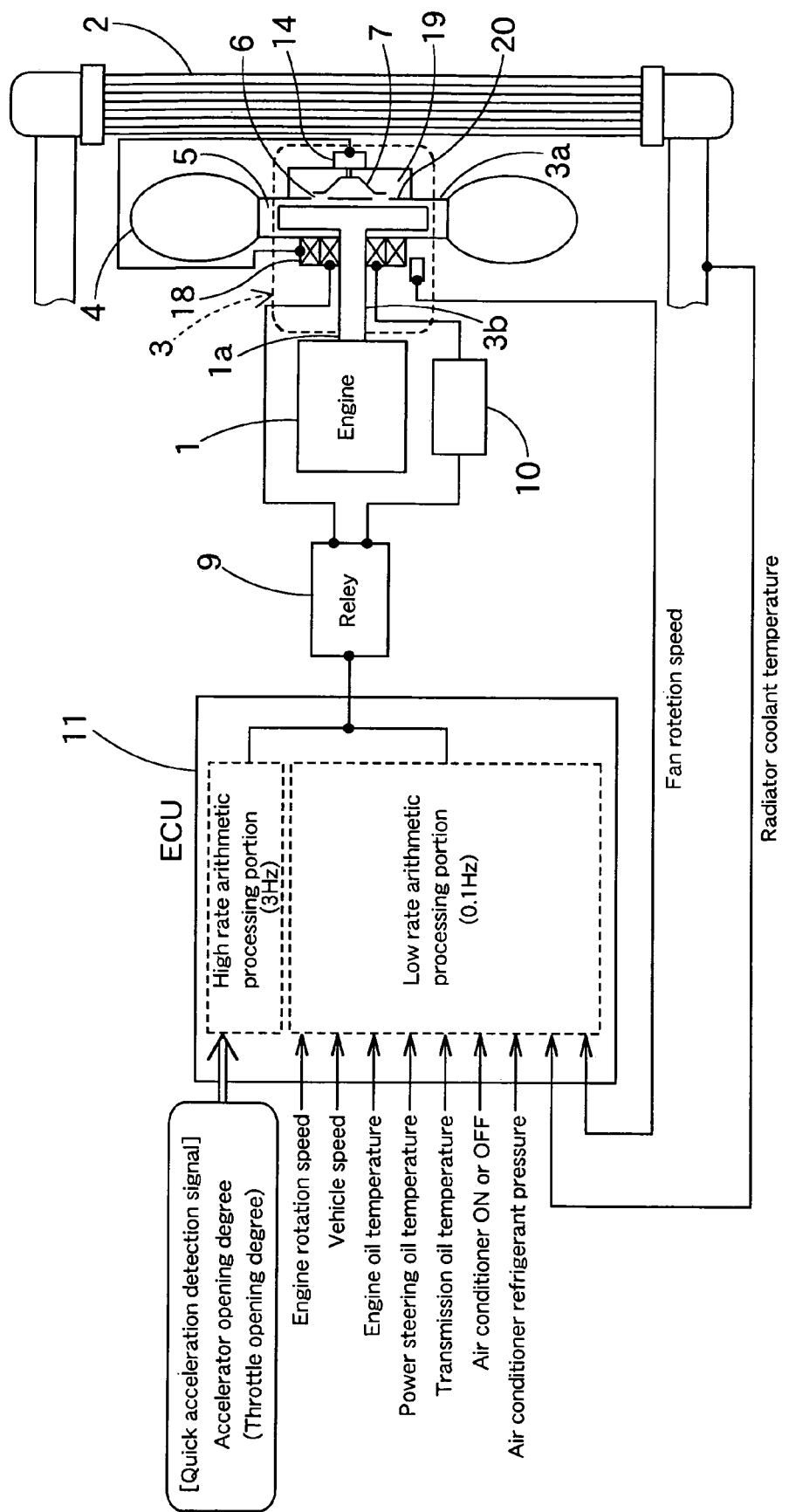
FIG. 3 is a configuration diagram of still another system for carrying out the same controlling method.

FIG. 1 is a configuration diagram of a system for carrying out a method for controlling an external control type fan coupling device according to one embodiment of the present invention, FIG. 2 is a configuration diagram of another system for carrying out the same controlling method, and FIG. 3 is a configuration diagram of still another system for carrying out the same controlling method.

First, a description will be given of an embodiment according to FIG. 1. In FIG. 1, reference numeral 1 denotes an internal combustion engine of a vehicle, and 2 denotes a radiator in which an engine coolant circulates. An external control type fan coupling device 3 is disposed at the output shaft side 1a for driving a fan of the engine 1, and a fan 4 is disposed at the output side (driven side) 3a of the external control type fan coupling device 3, which sucks in air from the radiator 2 side, sends air to the radiator 2 and cools an engine coolant in the radiator 2 using air.

The external control type fan coupling device 3 is, as shown in Japanese Published Patent Application Nos. 2003-239741 A and 2004-340373 A described above, such that an electromagnet and a fluid coupling are combined. Although not illustrated in detail in FIG. 1, the external control type fan coupling device 3 includes a torque transmission gap portion 5, into and out of which oil flows, between the drive side 3b, that is, the engine output shaft side 1a, and the driven side 3a (the fan 4 side). An oil circulation passage 6 communicates with the torque transmission gap portion 5, and a valve member 7 composed of a magnetic material, which opens and closes the oil circulation passage 6, is disposed in the oil circulation passage 6. The valve member 7 is controlled by an electromagnet 8 in regard to its valve opening and closing operation. When the electromagnet 8 is magnetized, the valve member 7 is attracted and is opened, thereby opening the oil circulation passage 6, and when the electromagnet 8 is demagnetized, the valve member 7 is closed, thereby closing the oil circulation passage 6. A battery 10 is connected to a coil of the electromagnet 8 via a relay 9. The relay 9 is controlled for turning on and off by an ECU (Electronic Control Unit) 11 being an arithmetic processing portion, and when the relay 9 is turned on, power of the battery 10 is supplied to the coil of the electromagnet 8, and when the relay 9 is turned off, power supply to the electromagnet 8 is interrupted.

The ECU 11 includes a CPU, a ROM, a RAM, an I/O, etc., although not illustrated, and carries out various types of electronic controls of a vehicle such as, air conditioner control, traction control, anti-braking control, in addition to carrying out a method for controlling the external control type fan coupling device 3 according to the present embodiment.

A vehicle having the engine 1 incorporated therein is provided with various types of sensors (not illustrated) to detect various types of states of the vehicle such as a running state of the engine 1 and a running state of an air conditioner, etc. Sensor output signals that are state detection signals output from these sensors are input into the I/O of the ECU 11. In the present embodiment, sensor output signals that respectively show an accelerator opening degree (that is, a throttle opening degree), an engine rotation speed, a vehicle speed, an engine oil temperature, a power steering oil temperature, a transmission oil temperature, air conditioner ON/OFF state, air conditioner refrigerant pressure, a fan rotation speed, and a radiator coolant temperature (temperature of engine coolant in the radiator 2) are input in the I/O of the ECU 11. Further, the accelerator opening degree corresponds to the stepping amount of an accelerator pedal (not illustrated). Also, the throttle opening degree is an opening degree of a throttle valve (not illustrated) disposed in the suction system of the engine 1. Since the throttle valve is opened and closed interlocked with the accelerator pedal, the throttle opening degree corresponds to the accelerator opening degree at a ratio of 1 to 1, wherein the accelerator opening degree can be referred to as the throttle opening degree. On the other hand, the I/O outputs a relay control signal to the relay 9.

The ECU 11 carries out arithmetic processing of the accelerator opening degree at a higher frequency than in arithmetic processing of sensor output signals other than the accelerator opening signal, and determines the rotation speed of the fan 4, which is the target, based on the arithmetic processing. And, the ECU 11 outputs a relay control signal in response to the rotation speed to the relay 9.

In detail, the ECU 11 has a high-rate arithmetic processing portion and a low-rate arithmetic processing portion. In the high-rate arithmetic processing portion, the ECU 11 carries out arithmetic processing to determine the rotation speed of the fan 4, using the accelerator opening degree signal as a parameter, at a high frequency (short cycle) of approximately 1 through 5 Hz (for example, 3 Hz). On the other hand, in the low-rate arithmetic processing portion, the ECU 11 carries out arithmetic processing to determine the rotation speed of the fan 4, using sensor output signals other than the accelerator opening degree signal as parameters, at a low frequency (long cycle) of approximately 0.05 through 0.2 Hz (for example, 0.1 Hz).

The reason why the frequency of arithmetic processing in which the accelerator opening degree signal is used as a parameter is set to approximately 1 through 5 Hz is that, if less than approximately 1 Hz, the response performance corresponding to quick start and quick acceleration of a vehicle is lowered, and a desired effect cannot be obtained, and, if more than 5 Hz, there is almost no difference in effect, the calculation load in the ECU 11 and the memory capacity are increased, heat is generated from the ECU 11, and there may be cases where noise from the external control type fan coupling device is increased due to the interval of generation of seating noise of the valve member 7 being shortened.

Also, the reason why the frequency of arithmetic processing using sensor output signals other than the accelerator opening degree signal as parameters is set to approximately 0.05 through 0.2 Hz is that, if less than approximately 0.05 Hz, the response is too slow, and the radiator coolant (engine coolant) and the air conditioner refrigerant pressure cannot be accurately controlled, and if higher than approximately 0.2 Hz, there is no difference in effect, the effect of reducing the calculation load in the ECU 11 and the memory capacity is reduced, and the effect of reducing heat generation from the ECU 11 is lowered.

Further, in the embodiment shown in FIG. 1, although arithmetic processing of sensor output signals other than the accelerator opening degree signal is uniformly carried out at 0.1 Hz in regard to all the sensor output signals, arithmetic processing may be carried out at different frequencies for sensor output signals other than the accelerator opening degree signal as the other arithmetic processing method. For example, arithmetic processing is carried out at a frequency of 0.2 Hz with respect to the engine rotation speed and the fan rotation speed, and arithmetic processing may be carried out at a frequency of 0.1 Hz for the other sensor output signals, for example, engine oil temperature, power steering oil temperature, etc.

The high-rate arithmetic processing portion and the low-rate arithmetic processing portion of the ECU 11, respectively, generate a relay control signal in response to the rotation speed of the fan 4, which is determined, and output the relay control signal to the relay 9. Also, it is assumed in the present embodiment that the relay control signal is output at a frequency of 3 Hz from the high-rate arithmetic processing portion and at a frequency of 0.1 Hz from the low-rate arithmetic processing portion at a timing not overlapping the relay control signal from the high-rate arithmetic processing portion. However, the relay control signal from the high-rate arithmetic processing portion may be output only when the signal is changed from the signal of one cycle before. This is because an attempt can be made to lengthen the service life of the relay 9. The relay 9 is controlled by the relay control signal for turning on and off.

When the relay 9 is turned on by the relay control signal, current is supplied from a battery 10 to a coil of the electromagnet 8, thereby causing the electromagnet 8 to be magnetized. The valve member 7 is attracted by the magnetized electromagnet 8 and carries out a valve opening motion, thereby opening the oil circulation passage 6. When the oil circulation passage 6 is opened, oil flows from an oil reservoir chamber 19 into the torque transmission gap portion 5, and the effective contact area of oil between the drive side and the driven side in the torque transmission gap portion 5 is increased, wherein the transmission torque from the drive side 3b to the driven side 3a is increased, and the rotation speed of the fan 4 is increased.

On the other hand, when the relay 9 is turned off by the relay control signal, current from the battery 10 to the coil of the electromagnet 8 is interrupted, thereby demagnetizing the electromagnet 8. An attraction force is released from the demagnetized electromagnet 8 in the valve member 7, and a valve closing motion is carried out by a resilient resetting force of a spring included in the valve member 7, thereby closing the oil circulation passage 6. When the oil circulation passage 6 is closed, oil is collected from the torque transmission gap portion 5 into the oil reservoir chamber 19 via an oil collection passage (not illustrated), wherein the effective contact area of oil between the drive side and the driven side of the torque transmission gap portion 5 is reduced, transmission torque from the drive side 3b to the driven side 3a is reduced, and the rotation speed of the fan 4 is reduced.

In the embodiment shown in FIG. 1, since the ECU 11 can detect a quick increase in the accelerator opening degree in quick start or quick acceleration of a vehicle by executing arithmetic processing of the accelerator opening degree signal at a higher frequency, the ECU 11 outputs a relay control signal to turn off the relay 9 when detecting a quick increase in the accelerator opening degree and closes the valve member 7, wherein the transmission torque from the drive side 3b to the driven side 3a is reduced, and the rotation speed of the fan 4 is prevented from quick increase.

Next, a description will be given of an embodiment according to FIG. 2. In the embodiment shown in FIG. 2, components that correspond to the respective components of the embodiment shown in FIG. 1 are given the same reference numerals as those of the embodiment shown in FIG. 1. In FIG. 2, reference numeral 1 denotes an internal combustion engine, and 2 denotes a radiator in which an engine coolant circulates. An external control type fan coupling device 3 is disposed at the output shaft side 1a for driving the fan of the engine 1, and a fan 4, which sends air to the radiator 2 by sucking in air from the radiator 2 side and cools the engine coolant (radiator coolant) in the radiator 2 using air, is disposed at the output side (the driven side 3a) of the external control type fan coupling device 3.

The external control type fan coupling device 3 is such that an electromagnetic clutch and a magnet type coupling are combined together as disclosed in Japanese Published Patent Application Nos. 2002-195303 A and 2003-156072 A.

The external control type fan coupling device 3 includes an electromagnetic clutch 12 provided at the output shaft side 1a, that is, the drive side 3b, of the engine 1, and a magnet coupling 13 provided at the driven side 3a (the fan 4 side) although not illustrated in detail in FIG. 2 (Refer to FIG. 2 of Japanese Published Patent Application No. 2002-195303 A).

The magnet coupling 13 is provided with a disk 16 to which a doughnut-shaped conductor (or hysteresis material) 15 is attached, and a permanent magnet 17 on which a plurality of segments are disposed like a doughnut. The disk 16 is provided at the electromagnetic clutch 12 side, and the permanent magnet 17 is provided at an output disk 13b to which the fan 4 is coupled, wherein the conductor 15 and the permanent magnet 17 are disposed opposite to each other with slight gap therebetween. And, as described later, the magnet coupling 13 is composed so as to transmit torque from the electromagnetic clutch 12 side to the fan 4 side utilizing a magnetic attraction force based on eddy currents generated at the conductor 15.

A battery 10 is connected to a coil of the electromagnetic clutch 12 via a relay 9. The relay 9 is connected to an ECU 11 that is an arithmetic processing portion.

The ECU 11 is provided with a CPU, a ROM, a RAM, an I/O, etc., although not illustrated. The ECU 11 carries out various types of electronic controls of a vehicle, for example, air conditioner control, traction control, anti-braking control, etc., in addition to carrying out a method for controlling the external control type fan coupling device 3 according to the present embodiment.

With respect to the present embodiment, sensor output signals showing an accelerator opening degree (that is, throttle opening degree), engine rotation speed, vehicle speed, engine oil temperature, power steering oil temperature, transmission oil temperature, air conditioner ON/OFF state, air conditioner refrigerant pressure, fan rotation speed, and radiator coolant temperature, respectively, are input from various types of sensors (not illustrated) to detect various types of states of the vehicle including the running state of the engine 1 into the I/O of the ECU 11. On the other hand, a relay control signal is output from the I/O to the relay 9.

As in the ECU 11 shown in FIG. 1, the ECU 11 carries out arithmetic processing of the accelerator opening degree signal at a higher frequency than the frequency for arithmetic processing of sensor output signals other than the accelerator opening degree signal, and outputs a relay control signal in response to the rotation speed of the fan 4, which is defined by the arithmetic processing, to the relay 9.

In detail, the ECU 11 has a high-rate arithmetic processing portion and a low-rate arithmetic processing portion as in the ECU 11 shown in FIG. 1. The ECU 11 carries out arithmetic processing to determine the rotation speed of the fan 4 at a higher frequency (short cycle) of approximately 1 through 5 Hz (for example, 3 Hz), using the accelerator opening degree signal as a parameter at the high-rate arithmetic processing portion, and carries out arithmetic processing to determine the rotation speed of the fan 4 at a lower frequency (long cycle) of approximately 0.05 through 0.2 Hz (for example, 0.1 Hz), using sensor output signals other than the accelerator opening degree signal as parameters at the low-rate arithmetic processing portion.

Here, the reason why the frequency of arithmetic processing in which the accelerator opening degree signal is used as a parameter is set to approximately 1 through 5 Hz and the reason why the frequency of arithmetic processing using sensor output signals other than the accelerator opening degree signal as parameters is set to approximately 0.05 through 0.2 Hz are the same as those described in the embodiment shown in FIG. 1.

Also, as in the embodiment shown in FIG. 1, the arithmetic processing of sensor output signals other than the accelerator opening degree signal may be carried out at different frequencies for respective sensor output signals.

The high-rate arithmetic processing portion and the low-rate arithmetic processing portion of the ECU 11, respectively, generate a relay control signal in response to the rotation speed of the fan 4, which is determined, and output the relay control signal to the relay 9. Also, it is assumed in the present embodiment that the relay control signal is output at a frequency of 3 Hz from the high-rate arithmetic processing portion and at a frequency of 0.1 Hz from the low-rate arithmetic processing portion at a timing not overlapping the relay control signal from the high-rate arithmetic processing portion. However, the relay control signal from the high-rate arithmetic processing portion may be output only when the signal is changed from the signal of one cycle before. This is because an attempt can be made to lengthen the service life of the relay 9. The relay 9 is controlled by the relay control signal for turning on and off.

The relay 9 supplies power of the battery 10 to the coil of the electromagnetic clutch 12 when being turned on, and interrupts power to the electromagnetic clutch 12 when being turned off. When the electromagnetic clutch 12 is turned on, an armature held on the disk 16 is attracted by a magnetized coil in a clutch rotor provided in the electromagnetic clutch 12, wherein the clutch rotor and the disk 16 rotate integrally with each other. And, the doughnut-shaped conductor 15 will rotate in a magnetic field generated from the doughnut-shaped permanent magnet 17 by rotation of the disk 16, wherein an eddy current is generated at the conductor 15. The permanent magnet 17 is attracted by a magnetic attraction force based on the eddy current, and rotation of the disk 16 is transmitted to the output disk 13b of the magnet coupling 13, wherein the output disk 13b rotates to cause the fan 4 to turn. That is, when the electromagnetic clutch 12 is turned on, the electromagnetic clutch 12 provided at the drive side 3b and the magnet coupling 13 provided at the driven side 3a are coupled to each other (brought into an interlocked state), and the output torque of the engine 1 is transmitted to the fan 4 via the electromagnetic clutch 12 and the magnet coupling 13 in order, wherein the rotation speed of the fan 4 is increased. On the other hand, when the electromagnetic clutch 12 is turned off, the electromagnetic clutch 12 provided at the drive side 3b and the magnet coupling 13 provided at the driven side 3a are disconnected from each other (brought into a non-interlocked state), wherein the output torque of the engine 1 is not transmitted to the fan 4 via the electromagnetic clutch 12 and the magnet coupling 13, and the rotation speed of the fan is decreased.

In the embodiment shown in FIG. 2, since the ECU 11 can detect a rapid increase in the accelerator opening degree in quick start or quick acceleration of a vehicle by carrying out arithmetical processing of the accelerator opening degree signal at a higher frequency, the ECU 11 outputs a relay control signal to turn off the relay 9 when detecting a rapid increase in the accelerator opening degree, and turns off the electromagnetic clutch 12. Therefore, the output torque of the engine 1 is not transmitted to the fan 4 via the electromagnetic clutch 12 and the magnet coupling 13, wherein since the output disk 13b is rotated only by transmission torque based on bearing friction of a bearing device by which the output disk 13b is rotatably attached to the output shaft of the engine 1, transmission torque from the drive side 3b to the driven side 3a is decreased, and the rotation speed of the fan 4 is prevented from rapidly increasing.

Further, a description will be given of an embodiment shown in FIG. 3. In the embodiment shown in FIG. 3, components that correspond to respective components of the embodiment shown in FIG. 1 are given the same reference numerals as those of the embodiment shown in FIG. 1. In FIG. 3, reference numeral 1 denotes an internal combustion engine of a vehicle, and 2 denotes a radiator in which an engine coolant circulates. An external control type fan coupling device 3 is disposed at the output shaft side 1a for driving a fan of the engine 1, and a fan 4 is disposed at the output side (driven side) 3a of the external control type fan coupling device 3, which sucks in air from the radiator 2 side, sends air to the radiator 2 and cools an engine coolant (radiator coolant) in the radiator 2 using air.

As has been disclosed in Japanese Published Patent Application Nos. 2006-162062 and 2006-162063 A, the external control type fan coupling device 3 is such that an electric actuator and a fluid coupling are combined with each other.

As shown in FIG. 3, the external control type fan coupling device 3 is provided with a torque transmission gap portion 5, into and out of which oil flows, between the drive side 3b, that is, the engine output shaft side 1a and the driven side 3a (fan 4 side). An oil circulation passage 6 communicates with the torque transmission gap portion 5, and a valve member 7 that opens and closes the oil circulation passage 6 is disposed in the oil circulation passage 6. The valve member 7 is controlled by a rotary type electric actuator 14 for its opening and closing. When the electric actuator 14 operates, the valve member 7 opens the valve by rocking and opens the oil circulation passage 6, and when the electric actuator 14 stops operating, the valve member 7 closes the valve by rocking in the reverse direction, and closes the oil circulation passage 6. Also, although FIG. 3 shows, in order to depict the oil circulation passage 6, that the valve member 7 is apart from a partitioning plate 20 in which the oil circulation passage 6 is formed, in actuality, the valve member 7 is in contact with the partitioning plate 20 and slides on the partitioning plate 20. The electric actuator 14 is connected to a power supply transformer 18, and an alternate current power source 10 is connected to the power supply transformer 18 via a relay 9. In addition, the power supply transformer 18 is such that it is provided with a non-rotating primary coil fixed at the engine block, etc., and a rotating secondary coil fixed at the output side 3a (Refer to FIG. 1 of Japanese Published Patent Application No. 2006-162062 A). The relay 9 is controlled for turning on and off by an ECU (Electronic Control Unit) 11 that is an arithmetic processing portion. When the relay 9 is turned on, power (alternate current voltage) of the alternate current power source 10 is supplied to the power supply transformer 18, and a current resultantly generated at the power supply transformer 18 is supplied to the electric actuator 14. Also, when the relay 9 is turned off, the relay 9 interrupts power supply to the power supply transformer 18, and current supply to the electric actuator 14 resultantly stops.

The ECU 11 is provided with a CPU, a ROM, a RAM, and an I/O, etc., although not illustrated, and carries out various types of electronic controls such as, air conditioner control, traction control, and anti-braking control in addition to carrying out a method for controlling the external control type fan coupling device 3 according to the present embodiment.

With respect to the present embodiment, sensor output signals showing an accelerator opening degree (that is, throttle opening degree), engine rotation speed, vehicle speed, engine oil temperature, power steering oil temperature, transmission oil temperature, air conditioner ON/OFF state, air conditioner refrigerant pressure, fan rotation speed, and radiator coolant temperature, respectively, are input from various types of sensors (not illustrated) to detect various types of states of the vehicle including the running state of the engine 1 into the I/O of the ECU 11. On the other hand, a relay control signal is output from the I/O to the relay 9.

As in the ECU 11 shown in FIG. 1, the ECU 11 carries out arithmetic processing of the accelerator opening degree signal at a higher frequency than the frequency for arithmetic processing of sensor output signals other than the accelerator opening degree signal, and outputs a relay control signal in response to the rotation speed of the fan 4, which is defined by the arithmetic processing, to the relay 9.

In detail, the ECU 11 has a high-rate arithmetic processing portion and a low-rate arithmetic processing portion as in the ECU 11 shown in FIG. 1. The ECU 11 carries out arithmetic processing to determine the rotation speed of the fan 4 at a higher frequency (short cycle) of approximately 1 through 5 Hz (for example, 3 Hz), using the accelerator opening degree signal as a parameter at the high-rate arithmetic processing portion, and carries out arithmetic processing to determine the rotation speed of the fan 4 at a lower frequency (long cycle) of approximately 0.05 through 0.2 Hz (for example, 0.1 Hz), using sensor output signals other than the accelerator opening degree signal as parameters at the low-rate arithmetic processing portion.

Here, the reason why the frequency of arithmetic processing in which the accelerator opening degree signal is used as a parameter is set to approximately 1 through 5 Hz and the reason why the frequency of arithmetic processing using sensor output signals other than the accelerator opening degree signal as parameters is set to approximately 0.05 through 0.2 Hz are the same as those described in the embodiment shown in FIG. 1.

Also, as in the embodiment shown in FIG. 1, the arithmetic processing in which sensor output signals other than the accelerator opening degree signal are used as parameters may be carried out at different frequencies for respective sensor output signals.

The high-rate arithmetic processing portion and the low-rate arithmetic processing portion of the ECU 11, respectively, generate a relay control signal in response to the rotation speed of the fan 4, which is determined, and output the relay control signal to the relay 9. Also, it is assumed in the present embodiment that the relay control signal is output at a frequency of 3 Hz from the high-rate arithmetic processing portion and at a frequency of 0.1 Hz from the low-rate arithmetic processing portion at a timing not overlapping the relay control signal from the high-rate arithmetic processing portion. However, the relay control signal from the high-rate arithmetic processing portion may be output only when the signal is changed from the signal of one cycle before. This is because an attempt can be made to lengthen the service life of the relay 9. The relay 9 is controlled by the relay control signal for turning on and off.

Since power is supplied from the alternate current power source 10 to the power supply transformer when the relay 9 is turned on by the relay control signal, a current is supplied to the electric actuator 14, and the electric actuator 14 operates. The valve member 7 rocks and opens the valve by actuation of the electric actuator 14, thereby opening the oil circulation passage 6. When the oil circulation passage 6 is opened, oil flows from the oil reservoir chamber 19 into the torque transmission gap portion 5, and the effective contact area of oil between the drive side and the driven side in the torque transmission gap portion 5 is increased, wherein transmission torque from the drive side 3b to the driven side 3a is increased to increase the rotation speed of the fan 4.

On the other hand, since current supply from the alternate current power source 10 to the power supply transformer 18 is interrupted when the relay 9 is turned off by the relay control signal, the electric actuator 14 stops operating. The valve member 7 rocks in the reverse direction by a spring resilient reset force of a return spring internally disposed in the electric actuator 14 when the electric actuator 14 stops operating, and closes the valve, thereby closing the oil circulation passage 6. When the oil circulation passage 6 is closed, oil is collected from the torque transmission gap portion 5 into the oil reservoir chamber 19 via an oil collection passage (not illustrated), and the effective contact area of oil between the drive side and the driven side in the torque transmission gap portion 5 is decreased, wherein transmission torque from the drive side 3b to the driven side 3a is decreased, and the rotation speed of the fan 4 is decreased.

In addition, in the embodiment according to FIG. 3, the power supply transformer 18 may be made into such a type as a permanent magnet and an electromagnetic coil are used therein as shown in Japanese Published Patent Application No. 2006-162063, and it may be composed that a switch provided in the power supply transformer 18 is turned on and off by a control signal generated by the ECU 11, and the current supplied to the electric actuator 14 is turned on and off.

In the embodiment according to FIG. 3, since the ECU 11 carries out arithmetical processing of the accelerator opening degree signal at a higher frequency, and can detect a rapid increase in the accelerator opening degree in quick start or quick acceleration of a vehicle, the ECU 11, when detecting a rapid increase in the accelerator opening degree, outputs a relay control signal by which the relay 9 is turned off, and closes the valve member 7, whereby transmission torque from the drive side 3b to the driven side 3a is decreased and the rotation speed of the fan 4 is prevented from being rapidly increased.

As described above, according to the respective embodiments described above, since arithmetical processing of the accelerator opening degree signal is carried out in a short cycle, a rapid increase in the accelerator opening degree in quick start or quick acceleration of a vehicle can be instantaneously reflected in the arithmetic processing. It can be controlled that the number of times of rotations of the driven side 3a is suppressed with respect to a rapid increase in the number of times of rotations of the drive side 3b of the external control type fan coupling device 3 in line with a rapid increase in the accelerator opening degree, whereby it is possible to prevent the rotation speed of the fan 4 from being rapidly increased. Accordingly, it becomes possible to attempt to reduce fan noise in quick start or quick acceleration of a vehicle, to reduce the loss in horsepower, and to improve the acceleration performance. Further, according to the respective embodiments described above, since arithmetical processing of sensor output signals other than the accelerator opening degree signal is carried out in a long cycle, the embodiments do not require a CPU, which carries out arithmetical processing at a high rate, and a memory of great capacity, wherein, by reducing the calculation load in the ECU 11 and downsizing of the memory, arithmetical processing for other control by the ECU 11 can be smoothly carried out, and it becomes possible to prevent the heat generation from the CPU.

Also, although, in the respective embodiments described above, sensor output signals showing an accelerator opening degree, an engine rotation speed, a vehicle speed, engine oil temperature, power steering oil temperature, transmission oil temperature, air conditioner ON and OFF state, air conditioner refrigerant pressure, a fan rotation speed and radiator coolant temperature, respectively, are input from various types of sensors into the I/O of the ECU 11, it is sufficient that the sensor output signals are signals necessary to control the rotation speed of the fan 4, wherein the sensor output signals are not limited thereto. However, it is necessary that the sensor output signals include a quick acceleration detection signal such as an accelerator opening degree signal (in other words, a throttle opening degree signal) and a signal other than the quick acceleration detection signal, wherein it is preferable that the sensor output signals include at least an engine rotation speed and a fan rotation speed as the signals other than the quick acceleration detection signal in view of favorable control of the rotation speed of the fan 4.

Also, a universal ECU that carries out various types of electronic controls other than the external control type fan coupling device 3 was used as the ECU 11 in the respective embodiments described above. However, it is a matter of course that an ECU exclusive for the external control type fan coupling device 3 may be used.

Figure 4:
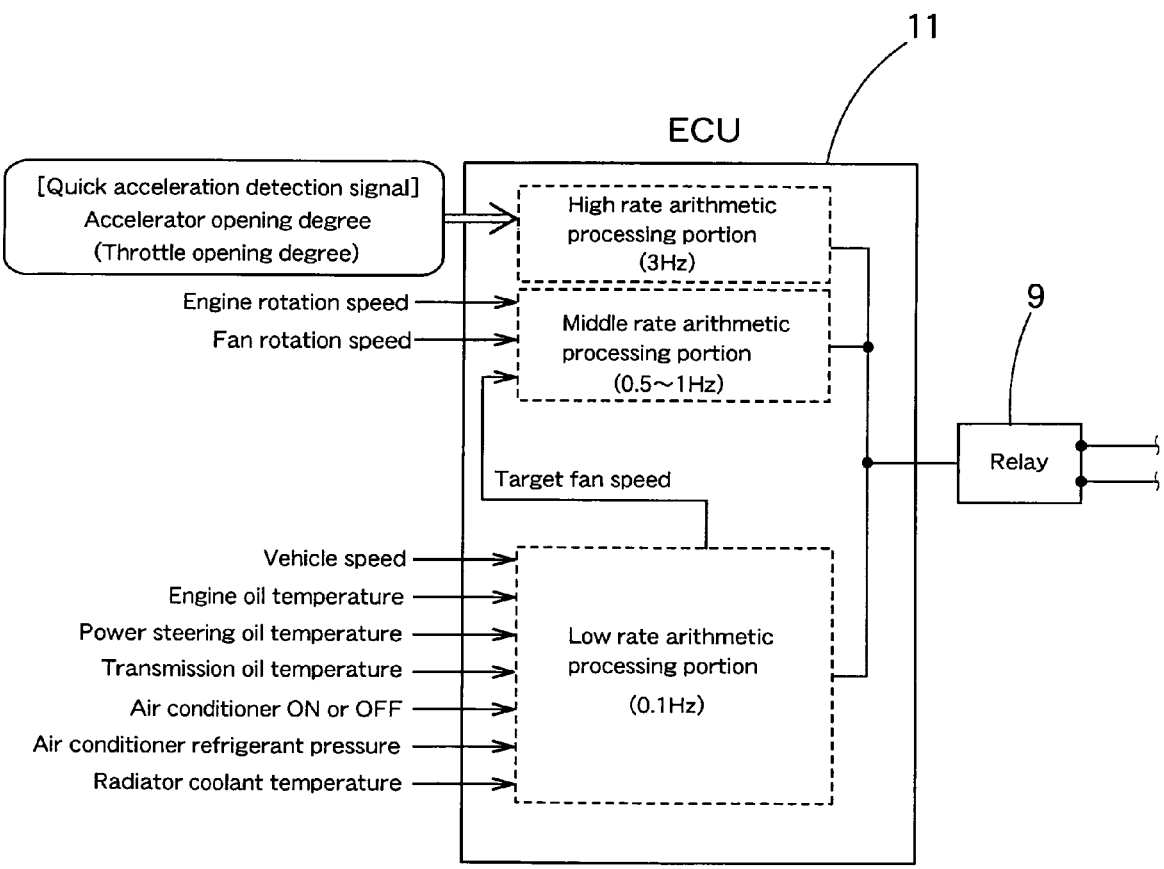
FIG. 4 is a configuration diagram of a system of the major parts for carrying out a method for controlling an external control type fan coupling device according to another embodiment of the present invention.

Next, a description will be given of an embodiment, in which the processing frequencies are differed from each other for signals other than the accelerator opening degree signal, with reference to FIG. 4. In the embodiment of FIG. 4, an ECU 11 carries out arithmetic processing of the accelerator opening degree signal at a higher frequency than that of the sensor output signal other than the accelerator opening degree signal, and carries out arithmetic processing of the engine rotation speed signal and fan rotation speed signal of the sensor output signal other than the accelerator opening degree signal at a higher frequency than the signals other than these. Also, the portions coming after the relay 9 are omitted in FIG. 4. The respective modes shown in FIG. 1 through FIG. 3 may be adopted as these portions.

In detail, the ECU 11 includes a high rate arithmetic processing portion that carries out arithmetic processing at, for example, 3 Hz, a middle rate arithmetic processing portion that carries out arithmetic processing at a predetermined frequency, for example, within 0.5 through 1 Hz, and a low rate arithmetic processing portion that carries out arithmetic processing at, for example, 0.1 Hz.

And, the low rate arithmetic processing portion carries out arithmetic processing using, as parameters, respective signals showing a vehicle speed, engine oil temperature, power steering oil temperature, transmission oil temperature, air conditioner on and off state, air conditioner refrigerant pressure, and radiator coolant temperature, determines the target fan speed (the optimal fan rotation speed), and inputs the signal showing the same into the middle rate arithmetic processing portion. Also, the low rate arithmetic processing portion outputs a control signal corresponding to the target fan speed into the relay 9.

The middle rate arithmetic processing portion carries out arithmetic processing using, as parameters, respective signals showing an engine rotation speed, a fan rotation speed and a target fan speed, generates a control signal to fluctuate the fan rotation speed (that is, to change the torque transmission from the drive side of the external control type fan coupling device 3 to the driven side thereof), and outputs the same to the relay 9. There is the method described in, for example, Japanese Published Patent Application No. 2006-112466 A described above as the arithmetic processing method described above. The method determines respective gains of PID control based on the gain matrix consisting of the target fan speed (the optimal fan rotation speed), fan rotation speed (actually measured rotation speed), and engine rotation speed, carries out PID arithmetic processing based on the gains and outputs control signals.

On the other hand, the high rate arithmetic processing portion carries out arithmetic processing using the accelerator opening degree signal as a parameter, and outputs, when detecting a rapid increase in the accelerator opening degree, a control signal to minimize the fan rotation speed (that is, to minimize the torque transmission from the drive side of the external control type fan coupling device 3 to the driven side thereof), for example, a control signal to close the valve member 7 where the fluid coupling as shown in FIG. 1 or FIG. 3 is used, or a control signal to cut off the electromagnetic clutch 12 where the magnet type coupling as shown in FIG. 2 is used, to the relay 9.

The high rate arithmetic processing portion of the ECU 11, the middle rate arithmetic processing portion thereof, and the low rate arithmetic processing portion thereof output relay control signals to the relay 9. However, in the present embodiment, it is assumed that a relay control signal from the high rate arithmetic processing portion, a relay control signal from the middle rate arithmetic processing portion, and a relay control signal from the low rate arithmetic processing portion are output at timings not overlapping each other. Further, it is sufficient that the relay control signals from the high rate arithmetic processing portion and the middle rate arithmetic processing portion are output only when the signals are changed from the signal of one cycle before, wherein an attempt can be made to lengthen the service life of the relay 9.

Thus, the engine rotation speed and the fan rotation speed of the sensor output signals other than the accelerator opening degree signal may be arithmetically processed at a higher frequency than the other signals. If so, this is preferable in a case where such PID control as has been described in Japanese Published Patent Application No. 2006-112466 A described above is carried out, wherein finer control in response to the states of the engine and the fan is enabled. As a result, the control performance can be further improved, fan noise can be suppressed, and remarkable improvement of fuel consumption can be brought about.

Further, it is preferable that the arithmetic processing of the accelerator opening degree signal is carried out at approximately 1 through 5 Hz in view of a reduction of calculation load in the ECU 11, suppression of an increase in the memory capacity, prevention of an increase in heat from the ECU 11, and prevention of fan noise while securing the response efficiency in quick start or quick acceleration of a vehicle. It is preferable that the arithmetic processing of signals other than the engine rotation speed signal and the fan rotation speed signal being the sensor output signals other than the accelerator opening degree signal is carried out at approximately 0.05 through 0.2 Hz in view of a reduction in calculation load in the ECU 11, downsizing of the memory capacity, and a decrease in heat generation from the ECU 11 by accurately grasping the radiator coolant temperature and the air conditioner refrigerant pressure, etc., and reflecting the same in control.

In addition, in the embodiments shown in FIG. 1 through FIG. 3, although it was assumed that the relay control signal from the high rate arithmetic processing portion and the relay control signal from the low rate arithmetic processing portion do not overlap each other in regard to the output timing, such a configuration may be adopted, in which there may be cases where both relay control signals overlap each other, and if overlapped, the relay control signals are adjusted by, for example, placing priority on the relay control signal from the high rate arithmetic processing portion. Similarly, in the embodiment shown in FIG. 4, such a configuration may be adopted, in which relay control signals from the high rate arithmetic processing portion, the middle rate arithmetic processing portion, and the low rate arithmetic processing portion may overlap each other, and if overlapped, the relay control signals are adjusted by, for example, placing priority on the relay control signals in order of the high rate arithmetic processing portion, the middle rate arithmetic processing portion, and the low rate arithmetic processing portion.

Further, in the embodiments shown in FIG. 1 through FIG. 3, it may be configured that a relay output generation portion is provided in the ECU 11, the high rate arithmetic processing portion and the low rate arithmetic processing portion determine a target rotation speed of fan 4 (target fan speed), respectively, the target fan speed is input into the relay output generation portion, and the relay control signal is generated based on the target fan speed in the relay output generation portion, and is output to the relay 9. Also, in the embodiment shown in FIG. 4, it may be configured that a relay output generation portion is provided in the ECU 11, the high rate arithmetic processing portion, the middle rate arithmetic processing portion, and the low rate arithmetic processing portion determine a target rotation speed of fan 4 (target fan speed), respectively, the target fan speed is input into the relay output generation portion, and the relay control signal is generated based on the target fan speed in the relay output generation portion, and is output to the relay 9.

Also, the signal input into the arithmetic processing portion is not limited to the sensor output signal output from various types of sensors. For example, where an ECU for engine control and an ECU for fan 4 control are separately provided, the ECU for engine control receives a sensor output signal, and outputs an injector control signal to control the injection time, etc., of an injector, the ECU for fan 4 control receives the injector control signal as a quick acceleration detection signal, and arithmetic processing is carried out, the injector control signal cannot be called as a sensor output signal. Also, in such an example, the quick acceleration detection signal is not limited to an accelerator opening degree signal, and the quick acceleration detection signal may be other signals such as, an injector control signal, a quick acceleration signal and a throttle opening degree operation amount signal from a preceding vehicle in an automatic slaved tracking type running system in which a plurality of succeeding vehicles led by a preceding vehicle are lined in a series and are run in automatic slaved tracking, or a quick acceleration signal from a control center in charge of the entirety or respective traveling zones of the automatic slaved tracking type running system. That is, the quick acceleration detection signal may be appropriately selected from signals which arithmetic processing portions are capable of detecting quick acceleration of internal combustion engine.

The invention claimed is:

1. A method for controlling an external control type fan coupling device, comprising the steps of
generating a control signal by carrying out arithmetic processing of a quick acceleration detection signal and signals other than the quick acceleration detection signal at an arithmetic processing portion to control the rotation speed of a fan provided at the driven side of the external control type fan coupling device, and
controlling torque transmission from the drive side of the external control type fan coupling device to the driven side thereof by means of said control signal,
wherein the arithmetic processing portion carries out arithmetic processing of the quick acceleration detection signal at a higher frequency than that in arithmetic processing of signals other than the quick acceleration detection signal.

2. The method for controlling the external type fan coupling device according to claim 1, wherein signals other than the quick acceleration detection signal include an engine rotation speed signal and a fan rotation speed signal, and
the arithmetic processing portion carries out arithmetic processing of the engine rotation speed signal and the fan rotation speed signal at a higher frequency than that in the arithmetic processing of signals other than those in the arithmetic processing of signals other than the quick acceleration detection signal.

3. The method for controlling the external control type fan coupling device according to claim 2, wherein the quick acceleration detection signal is an accelerator opening degree signal.

4. The method for controlling the external control type fan coupling device according to claim 2, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electromagnet for controlling valve opening and closing operations of the valve member,
wherein by controlling current supply to the electromagnet by the control signal, an effective contact area of oil between the drive side and the driven side in the torque transmission gap portion is increased and decreased, and torque transmission from the drive side to the driven side is controlled.

5. The method for controlling the external control type fan coupling device according to claim 2, wherein the external control type fan coupling device includes an electromagnetic clutch provided at the drive side and a magnet coupling provided at the driven side,
wherein by controlling current supply to the electromagnetic clutch by the control signal, the electromagnetic clutch and the magnet coupling are connected to and disconnected from each other, and torque transmission from the drive side to the driven side is controlled.

6. The method for controlling the external control type fan coupling device according to claim 2, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electric actuator for controlling valve opening and closing operations of the valve member,
wherein by controlling current supply to the electric actuator by the control signal, an effective contact area of oil between the drive side and the driven side in the torque transmission gap portion is increased and decreased, and torque transmission from the drive side to the driven side is controlled.

7. The method for controlling the external control type fan coupling device according to claim 1, wherein the arithmetic processing portion carries out arithmetic processing of the quick acceleration detection signal at a frequency of approximately 1 through 5 Hz.

8. The method for controlling the external control type fan coupling device according to claim 7, wherein the quick acceleration detection signal is an accelerator opening degree signal.

9. The method for controlling the external control type fan coupling device according to claim 7, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electromagnet for controlling valve opening and closing operations of the valve member,
wherein by controlling current supply to the electromagnet by the control signal, an effective contact area of oil between the drive side and the driven side in the torque transmission gap portion is increased and decreased, and torque transmission from the drive side to the driven side is controlled.

10. The method for controlling the external control type fan coupling device according to claim 7, wherein the external control type fan coupling device includes an electromagnetic clutch provided at the drive side and a magnet coupling provided at the driven side, wherein by controlling current supply to the electromagnetic clutch by the control signal, the electromagnetic clutch and the magnet coupling are connected to and disconnected from each other, and torque transmission from the drive side to the driven side is controlled.

11. The method for controlling the external control type fan coupling device according to claim 7, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electric actuator for controlling valve opening and closing operations of the valve member, wherein by controlling current supply to the electric actuator by the control signal, an effective contact area of oil between the drive side and the driven side in the torque transmission gap portion is increased and decreased, and torque transmission from the drive side to the driven side is controlled.

12. The method for controlling the external control type fan coupling device according to claim 1, wherein the arithmetic processing portion carries out arithmetic processing of signals other than the quick acceleration detection signal at a frequency of approximately 0.05 through 0.2 Hz.

13. The method for controlling the external control type fan coupling device according to claim 12, wherein the quick acceleration detection signal is an accelerator opening degree signal.

14. The method for controlling the external control type fan coupling device according to claim 12, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electromagnet for controlling valve opening and closing operations of the valve member, wherein by controlling current supply to the electromagnet by the control signal, an effective contact area of oil between the drive side and the driven side in the torque transmission gap portion is increased and decreased, and torque transmission from the drive side to the driven side is controlled.

15. The method for controlling the external control type fan coupling device according to claim 12, wherein the external control type fan coupling device includes an electromagnetic clutch provided at the drive side and a magnet coupling provided at the driven side, wherein by controlling current supply to the electromagnetic clutch by the control signal, the electromagnetic clutch and the magnet coupling are connected to and disconnected from each other, and torque transmission from the drive side to the driven side is controlled.

16. The method for controlling the external control type fan coupling device according to claim 1, wherein the arithmetic processing portion carries out arithmetic processing of the quick acceleration detection signal at a frequency of approximately 1 through 5 Hz, and carries out arithmetic processing of signals other than the quick acceleration detection signal at a frequency of approximately 0.05 through 0.2 Hz.

17. The method for controlling the external control type fan coupling device according to claim 1, wherein the quick acceleration detection signal is an accelerator opening degree signal.

18. The method for controlling the external control type fan coupling device according to claim 1, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electromagnet for controlling valve opening and closing operations of the valve member, wherein by controlling current supply to the electromagnet by the control signal, an effective contact area of oil between the drive side and the driven side in the torque transmission gap portion is increased and decreased, and torque transmission from the drive side to the driven side is controlled.

19. The method for controlling the external control type fan coupling device according to claim 1, wherein the external control type fan coupling device includes an electromagnetic clutch provided at the drive side and a magnet coupling provided at the driven side, wherein by controlling current supply to the electromagnetic clutch by the control signal, the electromagnetic clutch and the magnet coupling are connected to and disconnected from each other, and torque transmission from the drive side to the driven side is controlled.

20. The method for controlling the external control type fan coupling device according to claim 1, wherein the external control type fan coupling device includes a torque transmission gap portion provided between the drive side and the driven side, into and out of which oil flows, a valve member provided in an oil circulation passage communicating with the torque transmission gap portion, which opens and closes the oil circulation passage, and an electric actuator for controlling valve opening and closing operations of the valve member, wherein by controlling current supply to the electric actuator by the control signal, an effective contact area of oil between the drive side and the driven side in the torque transmission gap portion is increased and decreased, and torque transmission from the drive side to the driven side is controlled.

* * * * *